Oct. 9, 1956 W. H. EDMUNDS 2,766,405

PANEL BOARD BUS ARRANGEMENT AND CIRCUIT BREAKER MOUNTING BASE

Filed June 2, 1952

5 Sheets-Sheet 1

INVENTOR.
WILLIAM HAROLD EDMUNDS

BY

Ostrolenk & Faber
ATTORNEYS

Oct. 9, 1956 W. H. EDMUNDS 2,766,405

PANEL BOARD BUS ARRANGEMENT AND CIRCUIT BREAKER MOUNTING BASE

Filed June 2, 1952 5 Sheets-Sheet 2

INVENTOR.
WILLIAM HAROLD EDMUNDS

BY

Ostrolenk & Faber

ATTORNEYS

Oct. 9, 1956 W. H. EDMUNDS 2,766,405

PANEL BOARD BUS ARRANGEMENT AND CIRCUIT BREAKER MOUNTING BASE

Filed June 2, 1952 5 Sheets-Sheet 3

INVENTOR.
WILLIAM HAROLD EDMUNDS

BY

Ostrolenk & Faber

ATTORNEYS

Oct. 9, 1956 W. H. EDMUNDS 2,766,405
PANEL BOARD BUS ARRANGEMENT AND CIRCUIT BREAKER MOUNTING BASE
Filed June 2, 1952 5 Sheets-Sheet 4

INVENTOR.
WILLIAM HAROLD EDMUNDS
BY
[signature]
ATTORNEYS

Oct. 9, 1956 W. H. EDMUNDS 2,766,405

PANEL BOARD BUS ARRANGEMENT AND CIRCUIT BREAKER MOUNTING BASE

Filed June 2, 1952 5 Sheets-Sheet 5

INVENTOR.
WILLIAM HAROLD EDMUNDS

BY

Ostrolenk & Faber
ATTORNEYS 2,766,405

PANEL BOARD BUS ARRANGEMENT AND CIRCUIT BREAKER MOUNTING BASE

William Harold Edmunds, Havertown, Pa., assignor to I-T-E Circuit Breaker Company, Philadelphia, Pa.

Application June 2, 1952, Serial No. 291,090

1 Claim. (Cl. 317—119)

My present invention relates to a panel board bus arrangement and circuit breaker mounting base and more particularly is directed to a composite panel board construction that has no exposed contacting materials.

Panel board constructions have been so arranged that two supporting means were necessary, one for the bus arrangement and the other for the circuit breakers. Recent inventions have proposed a composite panel board so that the supporting means for the circuit breakers and source bus bars is a unitary structure. This structure is set forth in application Serial No. 220,893, filed April 13, 1951, and assigned to the same assignee as the instant application. Structures of a unitary supporting means for both the bus arrangement and the removable circuit breakers have the advantage of requiring less steel, have an overall saving in weight, are smaller in size and are economical to manufacture and install.

The panel board of my present invention is a composite structure and thus has all the advantages above noted. However, in addition to these advantages, my invention has additional advantages and overcomes the disadvantages of these prior art composite panel boards as will hereinafter be noted.

Composite panel boards comprising a particular bus arrangement and a unitary supporting means may be manufactured in any of several methods. One such method is set forth in the above mentioned application whereby the support mounting is moulded in a unitary piece.

The bus arrangement is then positioned and attached to the mounting in appropriate passageway or grooves and recesses which form the configuration of the moulded unitary mounting member. An insulating base or plate is then secured to the surface adjacent the passageways to form a cover and protective support for the bus arrangement.

Another method of manufacturing composite panel boards has been to preposition the bus arrangement in a mould and then mould the insulating mounting structure around this bus arrangement.

Still another method of manufacture is to provide a mounting with appropriate passageways and recesses in its upper surface. The bus arrangement is positioned through these openings and protected by means of a sealing compound.

The panel board of my present invention can be manufactured by any of the above mentioned methods and has all the advantages associated therewith.

Composite panel boards with a unitary supporting mounting of the prior art have had some decided disadvantages. These panel boards were constructed with projecting lugs to form disconnect contacts for the removable circuit breakers. These lugs were rigidly attached to transverse connecting bars of the longitudinal buses and extended from the bus bars above the upper surface of the panel board support moulding. Thus, with the projecting lugs extending either through or beyond the upper surface of the mounting block, it was possible that (1) adjacent buses could be short circuited if they were accidentally joined by a conducting material, (2) an operator could be severely burned or shocked if he accidentally touched the projecting lugs while installing a circuit breaker and (3) the extending or projecting lugs were subject to damage during the installation of the panel board.

With the panel board of my invention, it is possible to retain all the advantages of a composite panel board and still overcome all the above noted disadvantages associated therewith.

Particularly, my invention is directed to a composite panel board which has no exposed conducting material except where the main buses extend out of the ends of the moulding for connection to the source.

The panel board of my present invention has a series of vertical openings moulded into the upper surface of the support moulding or mounting block. The bus arrangement is imbedded in the moulding by either of the heretofore described methods of manufacture. Receiving holes are located at the ends of transverse connecting bars or straps of the buses and are disposed to register with the above mentioned vertical openings. Hence, the only way electrical contact can be made from the circuit breakers to the imbedded buses is to insert a circuit breaker back connecting prong through the vertical opening to fit into a hole of said bus bar. By this method, I provide a panel board which has no exposed conducting material, retains all the desirable features of the prior art composite panel board and eliminates all the undesirable features.

Several embodiments and modifications of my invention are set forth in this specification. One embodiment is to position the bus arrangement so that all the bus bars are parallel and in a horizontal plane. With this arrangement, the straps of each bus bar in which the receiving holes are located will have to have a vertical bend to permit the strap from each end bus bar to extend over the middle bus bar and still permit all the holes to lie in the same horizontal plane. With this embodiment, the single hole in each strap can be provided to receive a common prong for two circuit breakers. A modification of this arrangement proposes to place two holes in each strap or transverse member located on opposite sides of the center line of the panel board. With this arrangement, each hole is adapted to receive the prong from a different circuit breaker. With this arrangement, one circuit breaker can be removed from a bus while the other remains electrically connected thereto.

Another modification is the elimination of the necessity for a cross-connecting member or strap for the center bus bar. In this modification, the center bus bar is positioned lower than the outer two bus bars and the receiving holes for the center phase are located in the center bus bar. It will be noted that regardless of the particular bus arrangement which is used in the panel board, the end result will always be a panel board construction with no exposed conducting material.

Accordingly, a primary object of my invention is to provide a panel board arrangement which has no exposed disconnect members.

Another object of my invention is to provide a panel board structure with openings located in the moulding structure disposed above slots or holes in the bus arrangement.

A further object of my invention is a panel board which eliminates the possibility of having the bus arrangement short circuited.

Still another object of my invention is to provide a panel board construction comprising a mounting block and a bus arrangement in which the connecting means of the bus arrangement is located below the surface of the mounting block to prevent injury thereto during installation.

A still further object of my invention is a panel board for removable circuit breaker which is safe for the operator and eliminates the possibility of the operator receiving a shock or burn from the disconnect contacts.

Another object of my invention is a simplified panel board which has none of the disadvantages of the prior art composite unitary panel board but which retains all of the advantages thereof.

A further object of my invention is a panel board construction having no exposed electrical parts and having integral protrusion extending from the upper surface of the mounting block to receive and position removable circuit breakers.

Still another object of my invention is a panel board arrangement for removable circuit breakers which can be made by attaching a bus arrangement in appropriate grooves and recesses in a unitary moulding such that there are no exposed conducting surfaces extending above the moulding.

A still further object of my invention is to provide a panel board which can be manufactured by moulding an insulating support around a bus arrangement resulting in an end product which has openings located above receiving holes of the bus, for guiding the circuit breaker prongs into the holes.

Another object of my invention is to provide a panel board with no exposed contacting material which can be used for single phase, three phase or any other type of wiring system.

A still further object of my invention is to provide a panel board construction with no exposed electrical parts extending beyond the upper surface of the mounting block on which each circuit breaker attached thereto may be individually removable and replaceable without displacing the other circuit breaker.

These and other objects of my invention will be apparent from the following description of the drawings in which.

Figure 6:
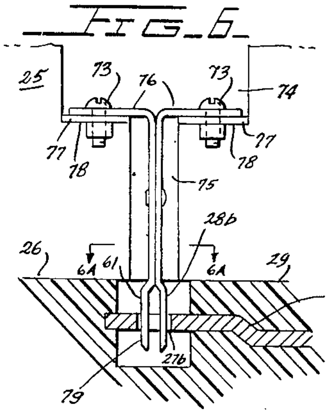
Figure 6 is a side view illustrating one embodiment of a rectangular prong and slot.
Figure 6A:
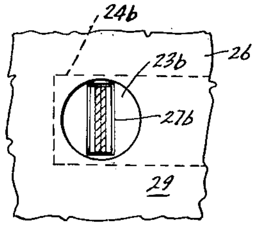

Figure 6*a* is a top view showing the rectangular slot of the bus bar for the rectangular prong of Figure 6.

Figure 7:
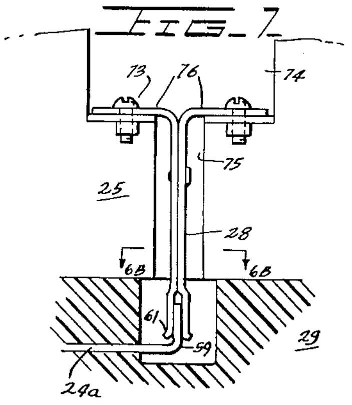

Figure 7 is a side view of a modification of a prong and bus attachment means showing an L-shaped bus strap with a circuit breaker spring fork prong member attached thereto.

Figure 7A:
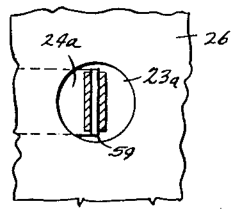

Figure 7*a* is a top view of the L-shaped bus strap of Figure 7.

Figure 8:
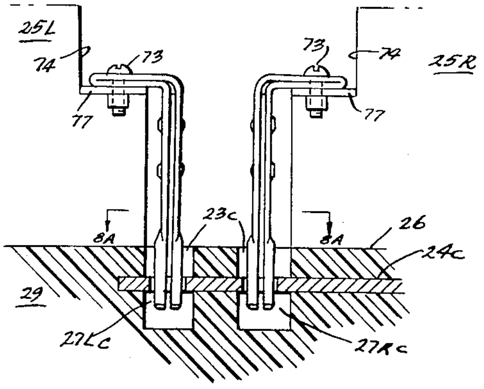

Figure 8 is a side view of another modification of the prong and receiving area of the bus bar showing a circular opening in the bus bar with a circular prong inserted therein. Figure 8 also illustrates a further modification of providing two receiving holes in a bus strap so that the circuit breakers can be mounted independently.

Figure 8A:
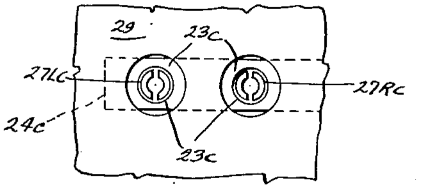

Figure 8*a* is a top view of the circular opening in the bus of the modification of Figure 8.

Figure 9:
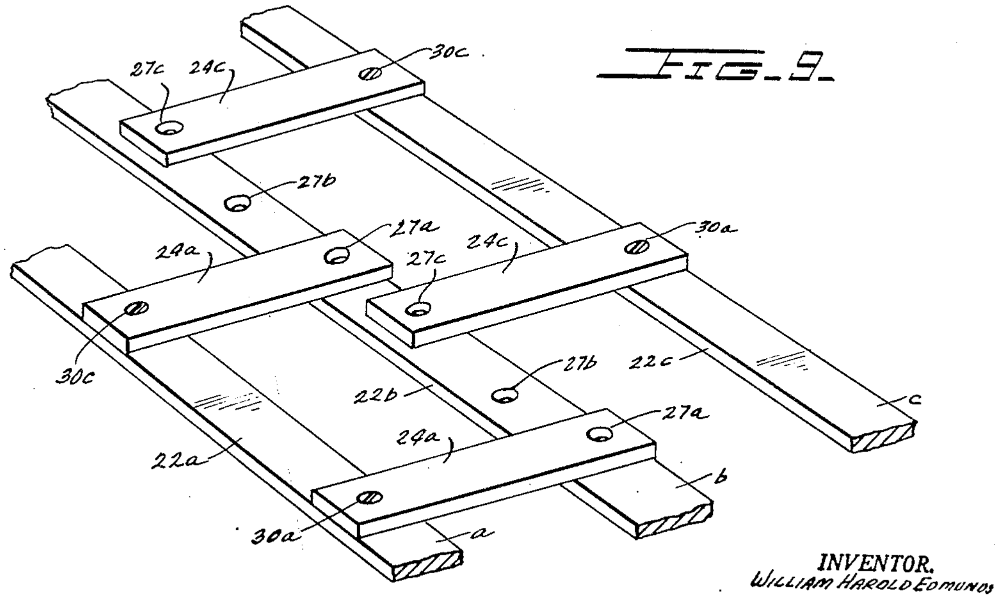

Figure 9 is a perspective view of a modification of the bus arrangement which requires no strap for the center bus bar.

Figure 10:
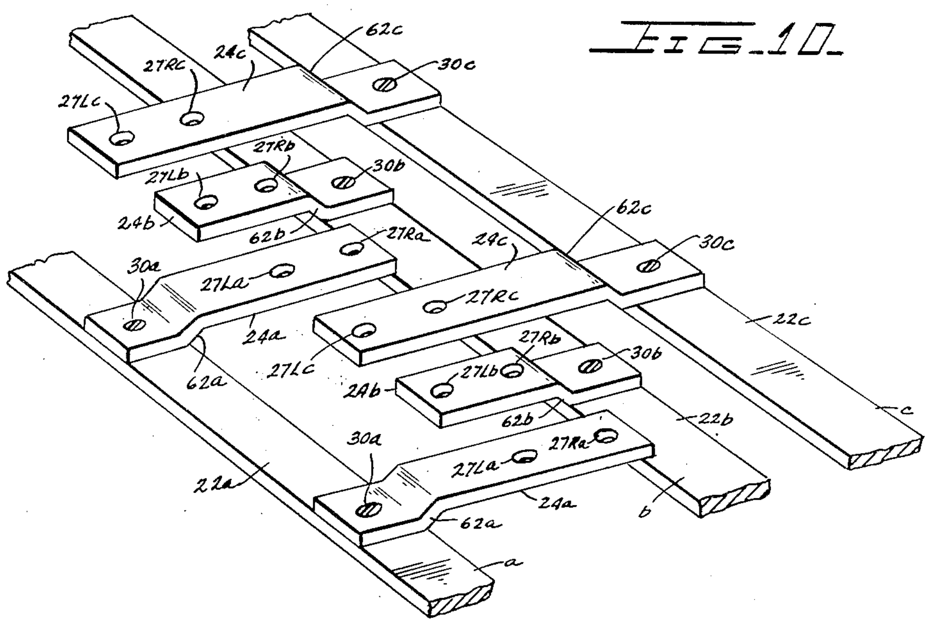

Figure 10 is a perspective view of a bus arrangement showing two holes arrangement of Figure 8, one on each side of the center line, located on each bus strap to thereby enable the circuit breaker connections to any phase to be independently removably connected.

Figure 1:
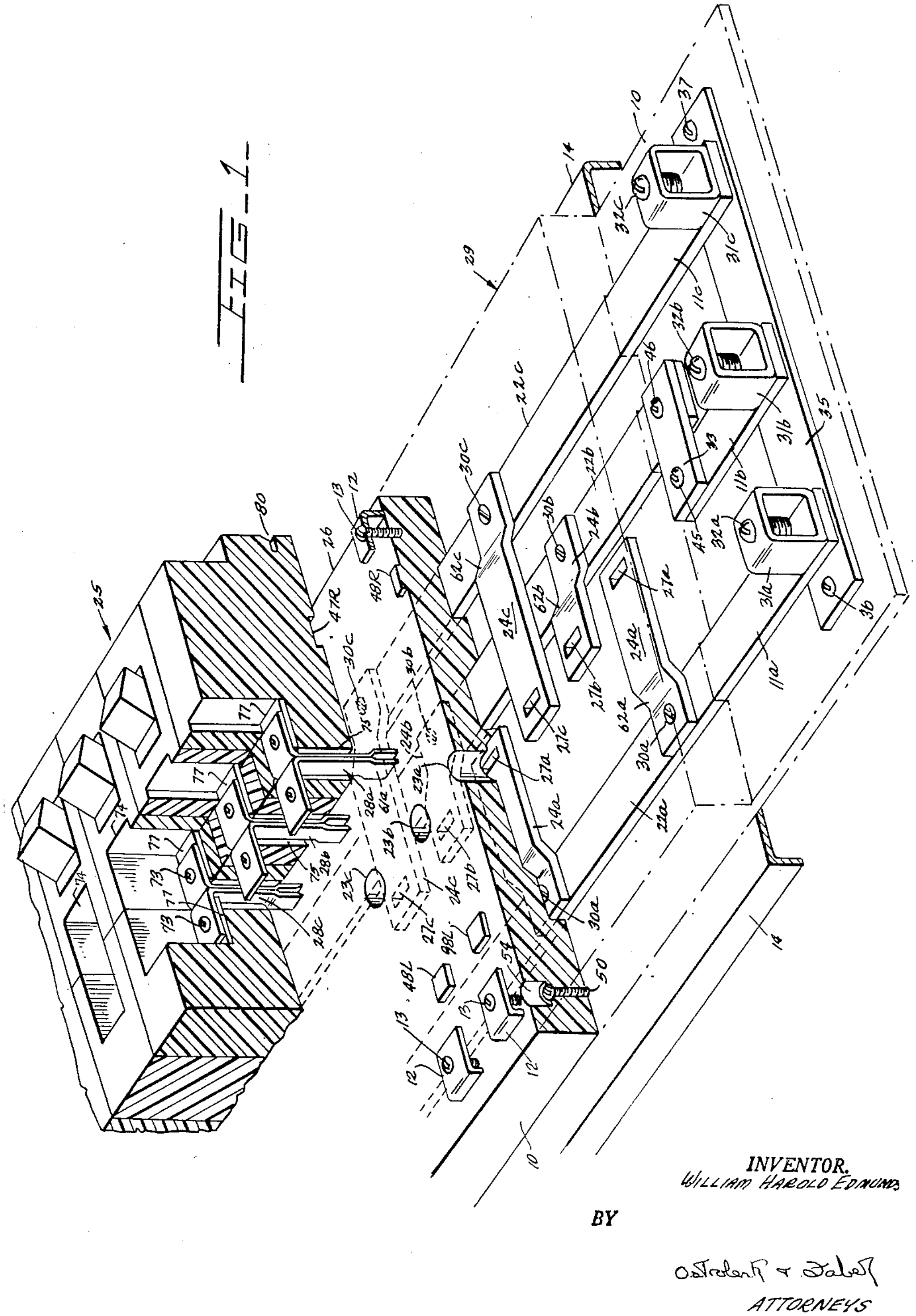
Figure 1 is a perspective view of a portion of the panel board, with the moulding support transparent to show the bus bar arrangement.

As was heretofore noted, the panel board of my invention can be manufactured by any one of a number of methods. Figure 1 shows a resulting panel board made whereby the bus arrangement is prearranged and the moulding support is moulded around the bus arrangement. Figures 2, 3, 4 and 5 show the identical bus arrangement as that used for Figure 1, but illustrate a panel board whereby the mounting is first moulded and then the bus arrangement is placed in the grooves thereof. This method of assembly whereby grooves and recesses are moulded into the mounting block is essentially the same as set forth in the aforementioned application. It will be noted that the support moulding 10 may be attached to the main mounting block 29 to thereby secure and protect the bus arrangement 22 or the grooves can be filled with insulating compound to completely seal the bus bars in place.

There are three main bus bars, **22*a*, 22*b* and 22*c***, each adapted to carry phase *a*, *b* and *c* respectively from the source.

Bus bar **22*a* is located at the left, bus bar 22*c* is located at the right and bus bar 22*b* is located to the right of the longitudinal center line of the moulding 29 and located between buses 22*a* and 22*c***.

Figure 2:
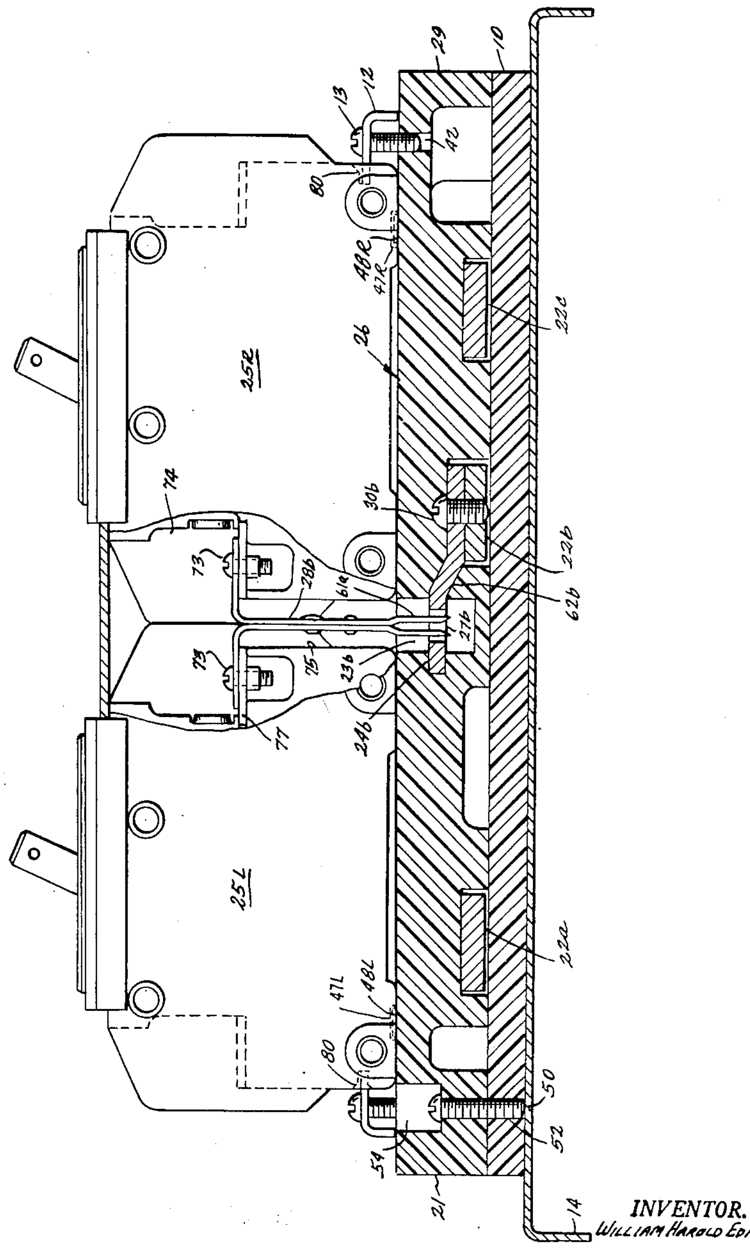
Figure 2 is a cross-sectional view of the moulding and imbedded bus bars with removable circuit breakers attached thereto.
Figure 3:
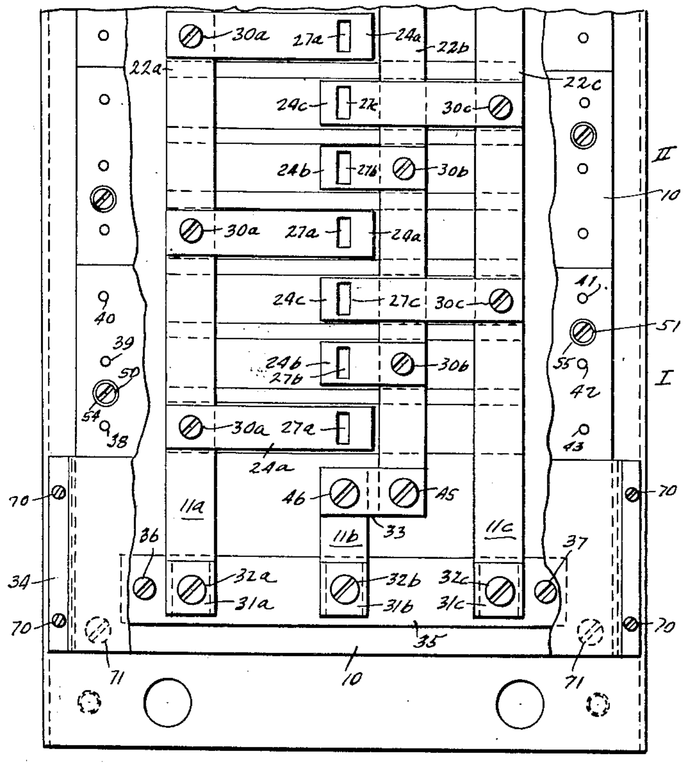
Figure 3 is a top plan view of the panel board of my invention showing the bus arrangement through a cut away portion of the top surface.

As best seen in Figures 1, 2 and 3, the longitudinal bus bars 22 have transverse members or straps 24 attached thereto and extending toward and past the longitudinal center line of the mounting block 29. As may be best seen in Figures 1 and 3, the transverse members **24*a*, 24*b* and 24*c* are in spaced relation and in parallel with each other. The transverse members 24 are rigidly attached at one end to the buses 22 by any suitable fastening means 30 such as screws or rivets. Each of the transverse members 24 has a slot opening 27** at the other end thereof as seen in Figures 1, 3 and 6*a*. The slot opening is adapted to receive the spring ends 61 of the circuit breaker prong 28 as will hereinafter be more fully described.

As best seen in Figures 1 and 3, the slots **27*a*, 27*b* and 27*c* will lie in a vertical plane passed through the longitudinal center line of the mounting block 29**.

It will be observed that if the three buses 22 are in a horizontal plane, it will be necessary that the transverse bar **24*c* be curved at 62*c* so that its left slotted end at 27*c* is higher than its attached right end at 30*c*. That is, since the bus bar 22*b* is in the same horizontal plane as bus bars 22*a* and 22*c* and located therebetween on the longitudinal center line of the moulding 29, the transverse member 24*c* will have to be curved to enable it to pass above the bus bar 22*b*** to insure that it does not come into electrical contact therewith.

Since it is necessary to provide transverse member **24*c* with a curved section in order to permit it to pass above the bus bar 22*b*, it will also be necessary to provide transverse members 24*a* and 24*b* with similar curved sections to insure that slots 27*a*, 27*b* and 27*c* are all located at the same vertical height. Hence, the slots 27 will not only be in the same longitudinal vertical plane, but will also be in spaced alignment along a longitudinal center line of the moulding 29**.

As best seen in Figure 1, moulding 29 is moulded with a series of spaced openings **23*a*, 23*b* and 23*c*. These openings may be vertical cylindrical holes or any other appropriate type of opening with the cross-section of opening 23*b*** best seen in Figure 2 and a top view of Figure 6*a*. These openings act as channels or guides for the connecting prongs 28 which are disconnect members for the plurality of removable circuit breakers 25, to permit the spring blades 61 of the prongs 28 to be inserted into the slots 27 and thereby make a positive electrical and mechanical connection between the bus bar transverse extension member 24 and the extension prongs 28 of the removable circuit breaker.

Thus, it should now be apparent that there is no exposed contacting material of the bus arrangement extending beyond the upper surface 26 of the moulding support 29. That is, the bus bars 22 and their associated transverse member 24 are completely imbedded within the moulding 29 so that access to the slots 27 is only achieved by passing a prong 28 through the vertical opening 23.

It will be noted that the mounting block 29 may have appropriate passageway and recess cut or moulded into the upper surface 26 to receive the bus arrangement of Figure 1, 9 or 10. With this modification, the bus arrangement can be sealed off by means of insulating compound, leaving appropriate openings only for the prong receiving holes 27.

As may be best seen in Figure 2, the removable circuit breakers are placed on the top surface 26 of the moulding 29.

Grooves 80 may be provided along the longitudinal side of the circuit breakers to receive the bracket 12 which is adjustably positioned by means of screw 13. The moulding is provided with a series of vertical holes 38, 39, 40, 41, 42 and 43 (Figures 2 and 3) to receive screws 13. These holes may be threaded inserts or the screw 13 can be of the self-tapping type.

Extensions 48L and 48R are moulded into the upper surface 26 of the moulding 29. These extensions are positioned in a transverse line and appear in alignment with the transverse cross bars 24. Thus, for each section of the panel board, there are extensions 48L on the left side and extensions 48R on the right side, as best seen in Figure 1. The removable circuit breakers are provided with grooves 47L and 47R to receive these extensions 48L and 48R, as best seen in Figures 1 and 2.

Thus, when the circuit breaker is to be mounted on the upper surface 26 of the moulding 29, the prongs 28 are guided into the openings 23 and the slots 27. The circuit breaker is then properly positioned on the surface 26 when the grooves 47 in the circuit breakers are in register with the series of extensions 48. After the circuit breaker has been properly positioned by the engagement of prong 28 and slots 27 and the register of grooves and extensions 47 and 48, the circuit breaker is then clamped tight to the base by means of bracket 12 in groove 80 by screw 13, as heretofore noted.

Figure 5:
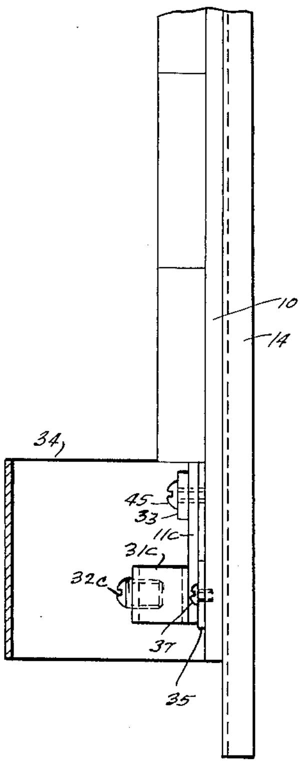
Figure 5 is a side view of the panel board of Figure 3 of my invention.
Figure 4:
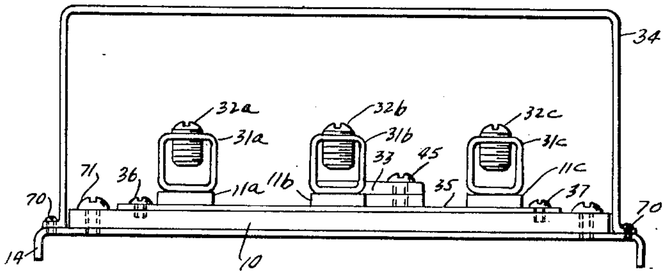
Figure 4 is an end side view of the panel board of Figure 3 of my invention showing the connection lugs for the bus bars.

As best seen in Figures 1, 3, 4 and 5, the main mounting block 29 is provided with a longitudinal extension 10, which may either be an integral part of mounting block 29 or a separate portion attached thereto as hereinafter more fully described. The bus bars 22 have integral extensions 11 which pass through the side of the mounting 29. An insulating sheet 35 is securely bolted to the moulding extension 10 by means of securing screw 36 and 37 (Figures 4 and 5). Thus, the bus bar extensions 11 extend through the side of moulding 29 and over the insulating surface 35 on extension moulding 10. Terminal connectors 31 are securely fastened to the ends of the bus bars extension 11 to provide means for connecting the power leads from a source to the bus bars 22. It will be noted that if the three terminal connectors 31 are to be equally spaced, it is necessary to provide an L-shaped connection 33—**11*b*, connected to bus bar 22*b* by means of bolt or screw 46, to ensure that the connector 31*b* will be located along the center line of moulding 29. The terminal connectors 31 may be of any standard make. In the connector illustrated, the same leads are inserted into the opening of the connector 31 and secured thereto by means of screw 32**.

The longitudinal extension 10 may be an integral part of the moulding 29, as seen in Figure 1, when the panel board is made by the method of moulding the support 29 around the bus arrangement. If the panel board is made by placing the bus arrangement in grooves and recesses of the pre-moulded support 29 then the member 10 may be a moulded or sheet of insulation material attached to the support 29 by means of screws 50 and 51, as best seen in Figures 2 and 3.

A U-shaped housing 34 is provided to protect the extension 11 of the bus bar 22 and their respective terminal connectors 31. The housing 34 is securely fastened to the mounting plate 14 by means of screws 70.

The entire unit of the bus bar arrangement and unitary moulding is mounted on a mounting plate 14. As best seen in Figure 4, screws 71 securely fastens the moulding extension 10 to the mounting plate 14.

The particular arrangement set forth in Figures 1, 2 and 3 show an embodiment whereby a single T-shaped prong can be used as a back connection for two circuit breakers 25R and 25L. Although this embodiment has the advantage of simplicity and a saving of space, it does not permit the removal of one circuit breaker without the removal of the other. With the bus arrangement set forth in the modification of Figure 10, each strap 24 is provided with two holes 27L and 27R located on opposite sides of the longitudinal center line of the panel board. The removable circuit breakers used with this modification will each have a separate prong, as best seen in Figure 8. Hence, if it is desired to remove circuit breaker 25R, it can be achieved without disturbing the other circuit breaker 25L.

It will be noted that in the modifications heretofore set forth, the holes for each phase strap were all located in a single horizontal plane. This has the advantage of requiring the same length prong regardless of which phase or phases the removable circuit breakers were connected. However, this arrangement also requires that a transverse member **24*b*** be provided for phase *b* and further requires that each of the transverse members 24 have a vertical bend 62. With the modification for the bus arrangement set forth in Figure 9, the transverse member for phase *b* is eliminated and no vertical bend is required for the transverse cross-member **24*a* and 24*c*. This is accomplished by having the bus bar 22*b* located along the longitudinal center line and below the plane of buses 22*a* and 22*c*. Hence, the transverse straps 24*a* and 24*c* will extend toward and past the longitudinal center line without coming into contact with the center bus 22*b*. The receiving hole 27*b*** for bus *b* is cut into the bus bar **22*b* and the receiving hole 27*a* and 27*c*** for phases *a* and *c* are cut into the transverse member **24*a* and 24*c*** as heretofore noted.

Figures 6, 7 and 8 show three types of prong arrangements which may be used for connecting the removable circuit breakers 25 to the panel board assembly.

The prong 28 of each modification may be T-shaped with cross portion 76, if it is to be used with a panel board having the arrangement of Figure 1, 3 or 9. That is, if the panel board has a single row of bus holes 27 and moulding openings 23 along the longitudinal center line of the unit, then the T-shaped prong will be used to enable two circuit breakers to be mounted simultaneously. This T-shaped prong is shown in Figures 6 and 7. However, if the bus arrangement of Figure 10 is used whereby each transverse member 24 has two holes, one on the left side and one on the right side of the longitudinal center line, then the prongs 28 will have an L-shape as shown in Figure 8.

The removable circuit breakers 25 have a step-down section 75 at end 74. The cross portion 76 of the prongs 28 are securely fastened by means of screws 73 to the circuit breaker conducting leads 77 and the ledge 78 of the opening 74. Thus, the prongs 28 are fastened to the circuit breaker 25 and extend below its lower surface to ensure its engagement with slot 27 when the breaker is placed on the surface 26 of the moulding 29.

The prong embodiment of Figure 6 has been partially described in connection with Figure 2. This prong has flat spring fingers 61 which are adapted to fit into the slot 27 (Figure 6*a*) located at the end of transverse extension member 24. It will be noted that spring fingers 61 have a diagonal cut 79 located at the bottom thereof to engage the longitudinal side of the slot 27 when the prong is first inserted. This ensures that the fingers 61 will be properly guided into the slot and will also enable them to be resiliently held against the longitudinal sides of slot 27 after the circuit breaker 25 is placed in position.

Figure 7 shows a modification of the prong and the attachment means of the transverse cross bar 24. In this modification, the end of the transverse member 24 is bent upwardly to form the extension 59 (Figure 7*a*). The prong 28 is designed with two spring fingers 61 which tend to come together. Hence, when the circuit breaker is placed in position on the moulding 29, a wedging action will hold the prong 28 to extension 59 of bus transverse section 24.

Figure 8 shows still another modification of the attachment means as adapted to the bus arrangement of Figure 10. In this modification, the two openings in the transverse cross-bar 24 are circular (Figure 8*a*) and thus, the fingers 61 of prongs 28 have a circular cross-section but otherwise are similar to the fingers of the prong shown in the embodiment of Figure 6. It will be noted that with the design of Figure 8, a large contacting area of about 330° is possible between the fingers 61 and bar 24.

It will be noted that the mounting block 29 can be a single piece adapted to support any number of circuit breakers or can be a series of segments to support three or six circuit breakers.

It will be apparent to those skilled in the art that one section of the panel board of my present invention can be used for mounting one or two three-phase circuit breakers, three or six single phase breakers, a series of two pole breakers or any other desired type of circuit breaker. It will be further noted that a series of sections, as noted in Figure 3 by I and II, can be added together to form a panel board for a plurality of one or three phase removable circuit breakers or the panel board can be moulded in a single unit to accommodate any number of circuit breakers.

Panel boards having the arrangement of my present invention have the advantage of distributing the load evenly among all the phases when single phase loads are connected thereto. Thus, if all loads of a motor nature are connected to the phases of section 1, each phase, *a*, *b* and *c*, will carry a similar load. Section II can have single phase loads of pure resistance connected thereto to properly distribute these loads between the three phases.

It will be further noted that my invention is not limited to a unitary support for source bus bar. Thus, if the panel board is to be used for single phase connection, a neutral bus bar may be imbedded in the moulding 29 along with the source bar 22. Furthermore, it is possible to make an unitary panel board structure in which both the source and load bus bars are imbedded in a single moulding 29. Also, it should be noted that the panel board is not restricted to either three phase or single phase use. One section, such as I, can be used to mount a three phase load, whereas section II can be used to mount three single phase loads.

Accordingly, my present invention results in a panel board arrangement which has no exposed connecting material except where the bus at the end of the panel board extends out the end of the moulding for connection to the source of power, is readily adaptable to a plurality of different types of connections, has all the advantages of the panel boards of the prior art and eliminates all the undesirable features of these units.

Thus, in the foregoing, I have described my invention only in connection with a preferred specific embodiment thereof. Many variations and modifications of the principles of my invention within the scope of the description herein are obvious. Accordingly, I prefer to be bound not by the specific disclosure herein but only by the appending claims.

I claim:

A three phase plug-in panel board construction for mounting circuit interrupters being comprised of an insulating mounting block, a first, second and third bus bar; said first, second and third bus bar being embedded in said insulating mounting block; said first, second and third bus bars extending in a direction parallel to each other and perpendicular to circuit interrupters to be mounted on said insulating mounting block; said insulating mounting block serving as a support for both the said bus bars and the circuit interrupters to be mounted thereon; and electrical conductor being associated with each of said first, second and third bus bars electrically connected thereto and extending in a direction perpendicular to said bus bars; said electrical conductor associated with said first bus bar extending toward said third bus bar; said electrical conductor associated with said third bus bar extending toward said first bus bar; each of said electrical conductors having holes to receive prongs from circuit interrupters to be mounted on and supported by said panel board; said insulating mounting block having a plurality of openings in the upper surface, a first of said openings extending from the upper surface of said insulating mounting block to said hole in said electrical conductor associated with said first bus bar, a second of said openings extending from the upper surface of said insulating mounting block to said hole in said electrical conductor associated with said second bus bar, a third of said openings extending from the upper surface of said insulating mounting block to said hole in said electrical conductor associated with said third bus bar; said first, second and third openings in said insulating mounting block being in alignment in the direction of said bus bars; said second opening being positioned adjacent said first opening; said third opening being positioned adjacent said second opening; said first, second and third opening adapted to receive a first, second and third prong respectively from a removable and replaceable circuit interrupter to be mounted on said insulating mounting blocks and to guide said first, second and third prongs respectively into mechanical and electrical engagement with said openings in said electrical conductors associated with said first, second and third bus bar; and said electrical conductors associated with said bus bar also being embedded in said insulating mounting block.

References Cited in the file of this patent

UNITED STATES PATENTS

| | | |
|---|---|---|
| 872,670 | McWilliams | Dec. 3, 1907 |
| 1,036,508 | Murray | Aug. 20, 1912 |
| 1,203,582 | Chase | Nov. 7, 1916 |
| 1,691,877 | Alden | Nov. 12, 1928 |
| 1,901,164 | Jackson | Mar. 14, 1933 |
| 1,938,309 | Williams | Dec. 5, 1933 |
| 2,007,174 | Benjamin | July 9, 1935 |
| 2,439,326 | Wilson | Apr. 6, 1948 |
| 2,599,695 | Christensen | June 10, 1952 |
| 2,609,414 | Weisberg | Sept. 2, 1952 |
| 2,613,252 | Heibel | Oct. 7, 1952 |